March 5, 1963  C. W. CONROSE  3,080,263
PROTECTION AND CLEANING OF LENSES
Filed June 30, 1958  2 Sheets-Sheet 1
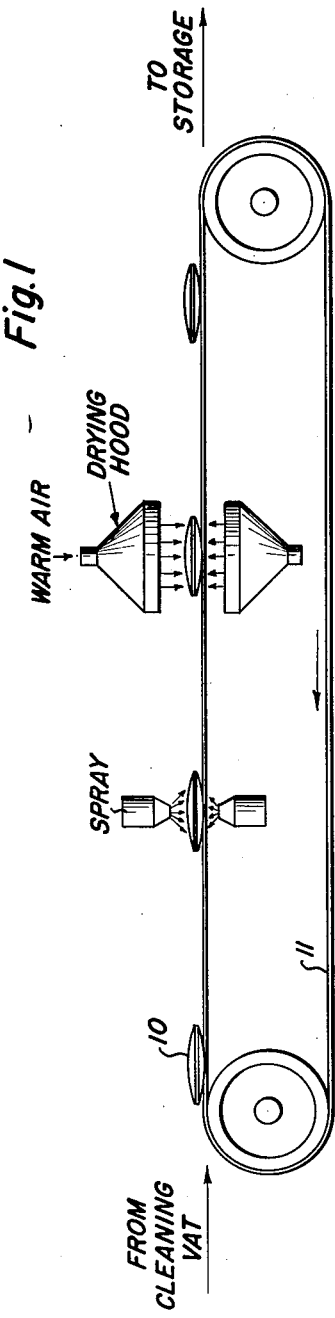
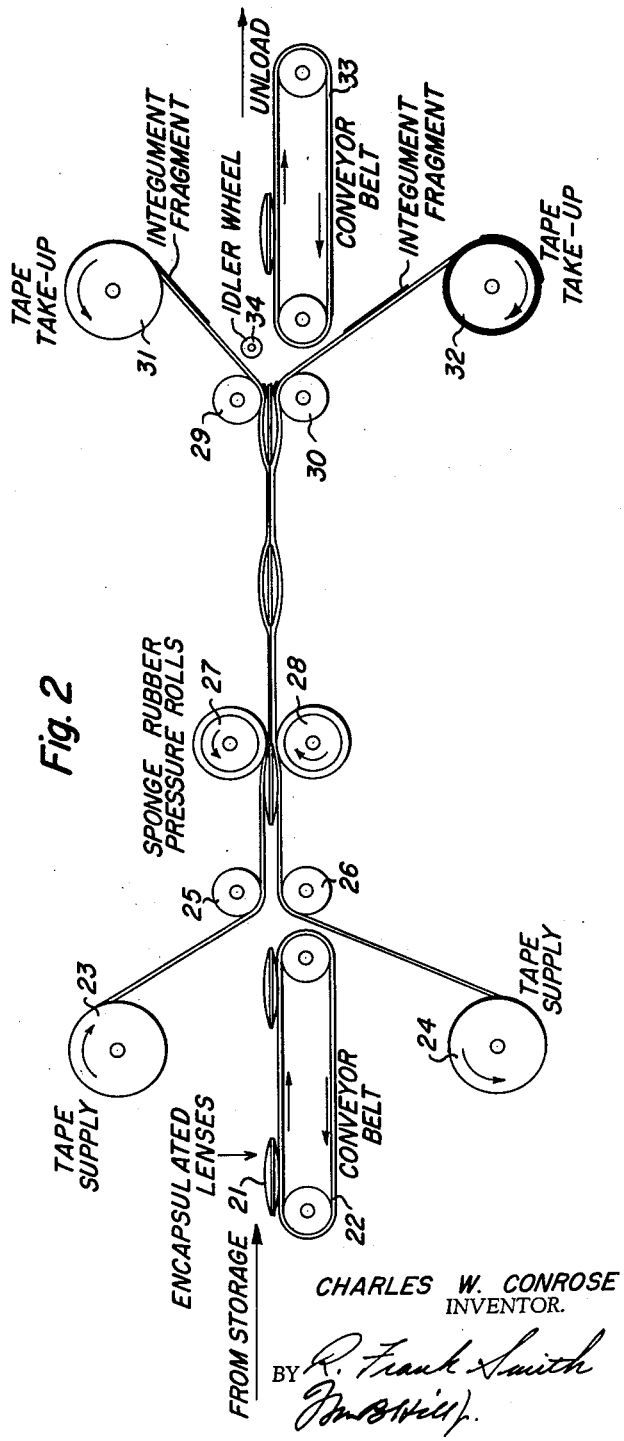
CHARLES W. CONROSE
INVENTOR.
BY R. Frank Smith
ATTORNEYS March 5, 1963 C. W. CONROSE 3,080,263
PROTECTION AND CLEANING OF LENSES
Filed June 30, 1958 2 Sheets-Sheet 2
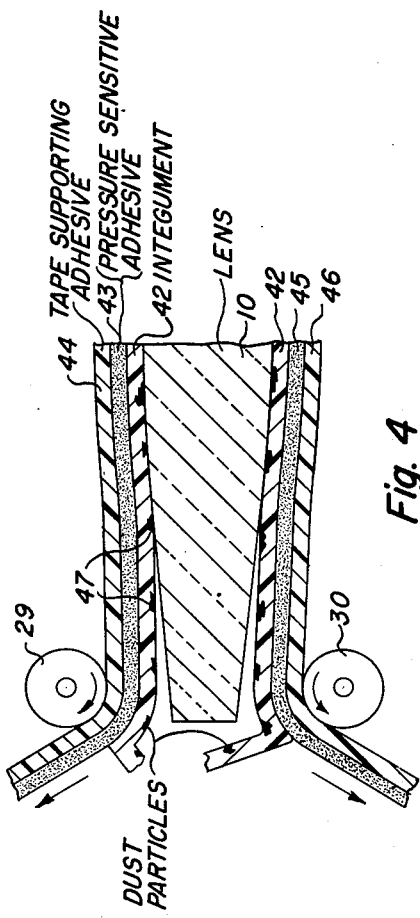
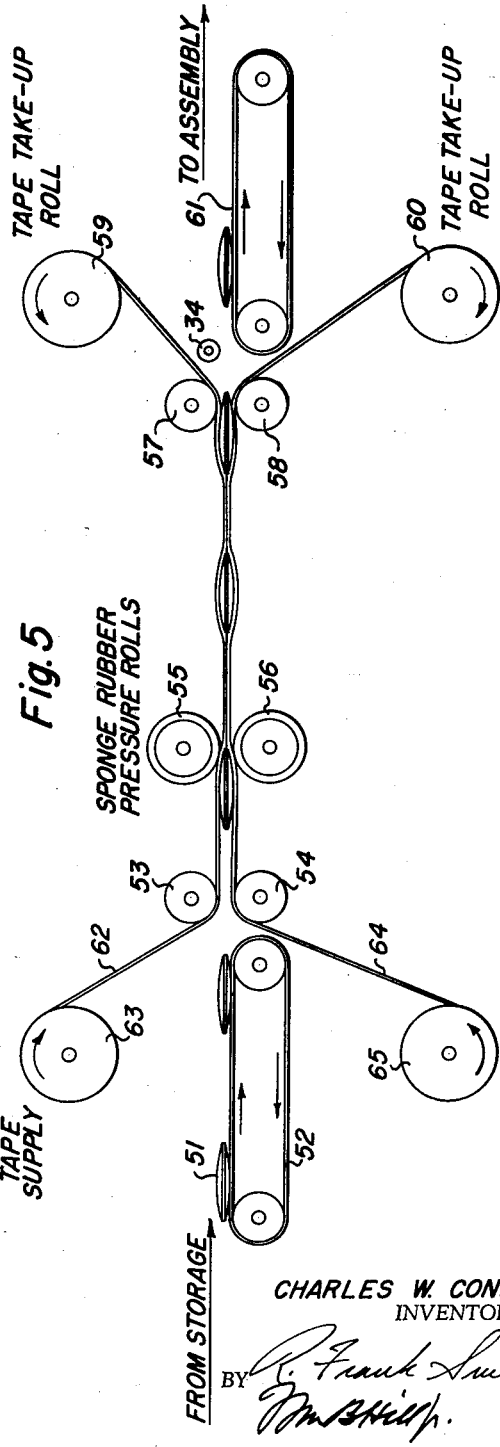
CHARLES W. CONROSE
INVENTOR.
ATTORNEYS

United States Patent Office 3,080,263
Patented Mar. 5, 1963

3,080,263
PROTECTION AND CLEANING OF LENSES
Charles W. Conrose, Rochester, N.Y., assignor to Eastman Kodak Company, Rochester, N.Y., a corporation of New Jersey
Filed June 30, 1958, Ser. No. 745,645
2 Claims. (Cl. 134—4)

The present invention relates to the cleaning and protection of the surfaces of finely machined and/or highly polished workpieces, such as lenses, through the application of strippable plastic materials such as adhesives and coating materials. In particular, the invention is concerned with a method for removal from a workpiece of a plastic integument in which such workpiece previously has been encapsulated for protection and cleaning purposes. One apparatus and method embodiment of the invention accomplishes removal of such integument by first fastening tapes to surfaces of the encapsulated material by means of adhesive, and then rupturing the integument and withdrawing it from the workpiece by pulling away the tapes.

The invention is illustrated in the accompanying drawings in which:

FIG. 1 is a diagrammatic representation of a method of encapsulating lenses with a plastic, strippable coating material prior to storage of the lenses;

FIG. 2 is a diagrammatic representation, in side elevation, showing the use of adhesive tapes in removing integuments of strippable coating material from lenses;

FIG. 3 is a sectional view through a lens encapsulated in an integument of a strippable coating material;

FIG. 4 is an enlarged sectional view through a portion of a lense from which a plastic integument is being removed; and FIG. 5 is a diagrammatic representation of a method of cleaning lenses using only a tape-supported, pressure-sensitive adhesive.

Lenses normally require drastic cleaning for removal of pitch and other debris and grease found on them following completion of grinding and polishing operations. Such cleaning normally is accomplished in a plurality of baths and brushing operations employing various types of solvents and detergents. Unless protected from the surrounding atmosphere, the thus cleaned, highly polished surfaces of the lenses not only accumulate deposits of dirt and dust, but the lens surfaces also are subject to surface deterioration thought to be the result of leaching by contaminants which are present in atmospheric air. Additional cleaning subsequently may be necessary after the lenses have had optical anti-reflection coatings deposited on them, since fluoride dust usually is stirred up within the coating apparatus when the vacuum is broken therein upon completion of the coating operation.

In accordance with the present invention, lens surfaces are cleaned and/or protected by application of mechanically removable plastic material applied immediately following completion of the drastic cleaning operation and/or completion of deposition of the anti-reflective material. Various types of plastic compositions which may be applied for cleaning and protecting lenses in accordance with the invention are available commercially. The plastic composition may be adhesive or non-adhesive, as will be explained below. If adhesive, preferably it should be supported on a tape or the like when applied to the lens surface. If non-adhesive, it preferably should be applied as a coating, initially in fluid form.

One non-adhesive particularly useful for lens cleaning is a composition manufactured by the Guard Coatings Corporation, Long Island City, New York, and sold under the name Metalguard No. 115. Another is Vapon Clear Strippable Coating, manufactured by the Vapon Division of Atlas Powder Company, Stamford, Connecticut. Any of a number of other formulations are suitable, all such formulations having the common property of being applicable as a liquid and transformable in situ on the work piece to a continuous, solid or semi-solid skin. Such coating materials may be applied in any of various ways such as spraying, dipping, or brushing, usually followed by a solvent removal or drying step to hasten the formation of a unitary integument. Such an integument not only is effective in excluding air and foreign particles, but it also serves to remove any such particles which may have lodged on the lens surface prior to the coating operation. The coating material does not necessarily exhibit adhesive attraction for the lens, but depends on cohesion for its effectiveness. Dust particles resting on the lens become embedded or occluded in the coating material, while some oily materials and the like may be dissolved therein, so that when the integument subsequently is removed, such foreign matter is removed along with it.

A primary object of the present invention is to provide a method for facilitating the rapid removal of a protective, cleansing integument from a lens when the latter is removed from storage to be assembled or subjected to additional treatment. In accordance with the invention, the encapsulated lens is fed into a bite formed by tapes having opposed adhesive surfaces, such tapes being made to travel in parallel paths spaced suitably to form the bite. The adhesive surfaces of the tapes are pressed into intimate contact with surfaces of the integument on the lens to form a strong adhesive bond with the integument. Subsequently, the tapes are pulled in opposite directions and away from the lens. The adhesive bonds between the tapes and integument being stronger than the cohesiveness of the latter and also stronger than the bonds between the integument and the lens, the integument is ruptured and pulled away from its lens in one or more pieces, all portions of the integument remaining adhered to the tapes as the latter are withdrawn. Thus, a clean lens having non-oxidized surfaces is presented for assembly or further treating.

With reference to FIG. 1, lenses 10 are received fresh from a chemical cleaning or optical coating operation and are placed on the feed end of a continuous conveyor 11, the direction of movement of which is indicated by arrows. In traveling along the upper flight of the conveyor, each lens is subjected consecutively to spraying and drying operations during which it becomes encapsulated with plastic material which is transformed to a mechanically strippable integument. If there is foreign matter on the lens during the coating operation, such matter becomes dissolved, absorbed, occluded or embedded in the fluid coating material. From the delivery end of the conveyor, the lenses may be moved to storage where they may be stored for long periods without deterioration. The condition of a lens 10 in storage is illustrated diagrammatically in FIG. 3 in which a relatively tough integument 42 of substantialy thickness encases the lens.

FIG. 2 shows the preferred method for removal of integuments from a group of lenses removed from storage preparatory to assembly or further treatment. Encapsulated lenses 21 are placed on the feed end of an endless conveyor 22 and are delivered by the latter to the bite formed by a pair of traveling adhesive tapes which are fed respectively from supply rolls 23 and 24 in a manner providing for adhesive surfaces of the tapes to be oppositely disposed. Suitable spacing of the tapes for formation of a bite of appropriate size is obtained through the spacing of rolls 25 and 26. The moving lenses pass between sponge rubber rolls 27 and 28 having more closely spaced opposed surfaces to force the tapes into intimate contact with the surfaces of the integuments covering the lenses, thereby obtaining strong adhesive bonds between the tapes and integuments. As is apparent from the drawing, the two tapes move in the same direction and at the same speed. The integuments are ruptured and removed from the lenses at the rolls 29 and 30 where the tapes are pulled away from the lenses in opposite directions under the tension of take-up rolls 31 and 32, such tension being sufficient to rupture the integuments and remove them, still adhered to the tape, from the lenses. A receiving conveyer 33 accepts the lenses which have been freed of their integuments, idler roll 34 being employed to steady the lenses as they pass onto the receiving conveyer.

FIG. 4 is a greatly enlarged sectional view showing the stripping action which takes place at the rolls 29 and 30, movement of the lens 10 and tapes 44 and 46, as indicated by the arrows, being to the left in this figure and therefore opposite to the direction of movement illustrated in FIGS. 2 and 5. The lens 10, encased in an integument 42, is being freed of the integument through the pulling action of the pressure sensitive adhesive 43 supported on a tape 44 and a like adhesive 45 supported on a tape 46. As illustrated, the integument 42 has been ruptured and the process of stripping has commenced at the leading edge thereof. Particles 47 of foreign matter embedded, occluded, absorbed or dissolved in the plastic material of the integument are being removed with the latter so that a clean lens surface results.

Depending upon the amount of atmospheric exposure or contamination to which a lens may have been subjected immediately following a prior lens cleaning operation, the protective and cleaning operations of the invention are subject to variation in character and may be embodied in a number of different forms. For instance, strippable plastic material, either adhesive or non-adhesive, may be applied and immediately thereafter removed, for cleaning purposes alone, if the lens is not to remain in storage.

FIG. 5 shows a cleaning operation employing only a tape-supported adhesive. In accordance with this embodiment of the invention, lenses 51 are moved on a continuous conveyer 52 into the bite of opposed adhesive surfaces of two tapes 62 and 64 supplied respectively from rolls 63 and 65 and moving in parallel paths separated by an amount determined by the position of rolls 53 and 54. The mechanical operation is similar to that illustrated in FIG. 2, but the function of the adhesive is to remove debris from the lens surfaces rather than to remove an integument which in turn would remove such debris. As shown in the figure, sponge rubber rolls 55 and 56 press the tapes into firm contact with the lens surfaces and at rolls 57 and 58 the tape is separated from the lens surfaces under the opposed pulling action of takeup rolls 59 and 60, each cleaned lens being presented to a receiving conveyer 61. If desired, the lenses, with the tape still applied, could be stored in the form of a roll for any necessary period, the tape subsequently being pulled off when the lenses are to be put to use.

It will be understood that other workpieces than lenses can be protected for storage and cleaned in accordance with the teaching of the present invention, the main purpose of which will be understood to be the provision of a method and means for facilitating rapid application and removal of integuments of strippable coating material previously applied to the workpieces.

When the shape of an article or the conformation or character of its integument is such that initial rupture cannot be obtained solely through the pulling action of an adhesive tape, rupture may be initiated by puncturing or slitting the integument with a sharp tool, such as a knife edge held in the path of the moving encapsulated workpieces. Due to the nature of the material forming the pellicle, completion of the operation of parting the integument from its workpiece is easily accomplished by the tapes once the continuity of the integument has been broken. That is to say, once an incision has been made, only slight tension is required to continue the splitting action, the complete rupture, and removal of the integument from the workpiece.

Adhesives suitable for use with the invention are, as indicated above, preferably of a pressure-sensitive type, although it is within the spirit of the invention to substitute in the method heat-sensitive adhesives or water-sensitive adhesives or the like by using suitable means to activate the adhesive when it is applied. The nature of the tape used to support the adhesive is not critical so long as minimum requirements of tensile strength, flexibility and a tenacious bond to the supported adhesive are met. One suitable combination of tape and adhesive is available in a pressure-sensitive adhesive supported on a tape of cellulosic, e.g. cellophane, sheeting, the combination being manufactured by Minnesota Mining and Manufacturing Company and sold under the trade name "Scotch." The adhesive may, if desired, be supported on other flexible materials such as paper and cloth or on more elastic material such as certain vinyl plastics, easily capable of conforming to the lens surfaces.

The invention has been described in detail with particular reference to preferred embodiments thereof, but it will be understood that variations and modifications can be effected within the spirit and scope of the invention as described hereinabove and as defined in the appended claims.

I claim:

1. Method for removing a plastic integument from a workpiece encased therein comprising feeding from supply rolls elongated tapes in concurrent, parallel paths spaced from each other by a distance which provides a bite suitable for receiving said workpiece, the opposing surfaces of the tapes carrying an adhesive having an adhesive attraction with respect to the material of the integument, feeding the workpiece into the bite, pressing the tapes against the integument to force the adhesive carried by the tapes into intimate contact with the contiguous surfaces of the integument, pulling the tapes in opposite directions away from the workpiece, thereby stripping at least a portion of the integument from the workpiece and carrying such stripped portion away from the workpiece.

2. A method for cleaning a workpiece comprising encapsulating the workpiece in a fluid plastic coating material, converting the coating material so applied into a solid integument, adhering a tape supported adhesive material to a surface of the integument and applying tension to the tape tending to pull it away from the workpiece while restraining movement of the workpiece, thereby pulling the integument off of and away from the workpiece.

References Cited in the file of this patent
UNITED STATES PATENTS

| | | |
|---|---|---|
| 1,275,365 | Busman | Aug. 13, 1918 |
| 1,565,536 | Wandel | Dec. 15, 1925 |
| 1,629,038 | Leightlitner | May 17, 1927 |
| 1,644,642 | Horihata | Oct. 4, 1927 |
| 1,909,200 | Livingstone | May 16, 1933 |
| 2,221,348 | Hersey et al. | Nov. 12, 1940 |
| 2,323,599 | Hawk | July 6, 1943 |
| 2,377,774 | Gotham | June 5, 1945 |
| 2,428,443 | Whitehead | Oct. 7, 1947 |
| 2,525,651 | Cluman | Oct. 10, 1950 |
| 2,653,429 | Fitzgerald | Sept. 29, 1953 |
| 2,755,494 | Bredin | July 24, 1956 |
| 2,878,928 | Ivy | Mar. 24, 1959 |
| 2,889,922 | Clarvoe | June 9, 1959 |
| 2,914,166 | Bihler | Nov. 24, 1959 |